(12) United States Patent
Ozaki

(10) Patent No.: US 8,232,754 B2
(45) Date of Patent: Jul. 31, 2012

(54) CONTROL DEVICE FOR ELECTRICALLY DRIVEN DOOR

(75) Inventor: Satoru Ozaki, Tokyo (JP)

(73) Assignee: Fuji Electric Co., Ltd. (JP)

(*) Notice: Subject to any disclaimer, the term of this patent is extended or adjusted under 35 U.S.C. 154(b) by 393 days.

(21) Appl. No.: 12/547,829

(22) Filed: Aug. 26, 2009

(65) Prior Publication Data
US 2010/0050526 A1     Mar. 4, 2010

(30) Foreign Application Priority Data

Aug. 26, 2008  (JP) ................. 2008-216775
Aug. 26, 2008  (JP) ................. 2008-216776

(51) Int. Cl.
*H02P 6/12* (2006.01)
*H02P 7/00* (2006.01)
*H02P 3/00* (2006.01)

(52) U.S. Cl. ............ 318/400.15; 318/264; 318/272; 318/275; 318/277; 318/282; 318/286; 318/432; 318/434; 318/466; 318/467; 318/468; 318/470

(58) Field of Classification Search .......... 318/264, 318/272, 275, 277, 282, 286, 400.15, 432, 318/434, 466, 467, 468, 470

See application file for complete search history.

(56) References Cited

U.S. PATENT DOCUMENTS

| 5,137,118 A * | 8/1992 | Iwata ................ 187/316 |
| 2003/0205000 A1 * | 11/2003 | Pagowski .......... 49/341 |
| 2004/0189046 A1 * | 9/2004 | Kawanobe et al. ........ 296/155 |
| 2004/0262945 A1 * | 12/2004 | Suzuki et al. .......... 296/155 |
| 2007/0016332 A1 * | 1/2007 | Tyni et al. ............ 700/275 |
| 2008/0263964 A1 * | 10/2008 | Ludwig et al. ......... 49/506 |

FOREIGN PATENT DOCUMENTS

JP    03-189265 A    8/1991

OTHER PUBLICATIONS

Kunio Kobayashi et al., "Impact Force Suppression Control when Train Doors are Closed" (The University of Tokyo) (Partial Translation).

* cited by examiner

Primary Examiner — Walter Benson
Assistant Examiner — Gabriel Agared
(74) Attorney, Agent, or Firm — Rossi, Kimms & McDowell LLP

(57) ABSTRACT

A control device for an electrically driven door is provided that can enhance the sensitivity of detection of a door pinch state and that can prevent a passenger from being pressed when the door pinch state occurs. The control device includes a driving force instruction value producing unit that outputs a driving force instruction value of the electrically driven door, a state observing unit that estimates a mechanical resistant force to a door driving system, a reference model that determines a dynamic characteristic of the electrically driven door to the mechanical resistant force estimated by the state observing unit, a gain compensator that computes a control compensation value that makes an output of the reference model coincide with an actual speed of the electrically driven door; and an adder that adds the control compensation value computed by the gain compensator to the driving force instruction value outputted by the driving force instruction value producing unit.

11 Claims, 9 Drawing Sheets (NORMAL DOOR CONTROL)

(WITH LIGHTER DOOR)

CONTROL DEVICE FOR ELECTRICALLY DRIVEN DOOR

BACKGROUND OF THE INVENTION

The present invention relates to a control device for an electrically driven door and, in particular, to a control device that drives an electrically driven door safely when foreign matter is pinched by the door.

In an electrically driven door driven by an electric motor, for example, a side sliding door of a rail car, the detection that a passenger or foreign matter, such as passenger's belonging, is pinched by the door when the door is closed (a so-called "door pinch" state) is a very important function in securing the safety of the passenger. For this reason, a door pinch detecting device has been proposed to detect the door pinch state.

JP-A 3-189265, for example, discloses a device that includes: a speed detecting unit for detecting the opening/closing speed of a door; a position detecting unit for detecting that the door is located at a middle position in the opening/closing operation; a determination unit that receives the detection results of the speed detecting unit and the position detecting unit and that determines whether the opening/closing speed of the door located at the middle position of the opening/closing operation is zero, in a decreasing state, or in a minus state; and a notification unit that outputs a signal for notifying that foreign matter is pinched by the tip of the door when the determination unit determines that the opening/closing speed of the door located at the middle position of the opening/closing operation is zero, in the decreasing state, or in the minus state ( ). Moreover, in the same patent document, a door pinch detecting device is described that has a pressure sensing sensor disposed in a rubber piece fitted to the tip of the rail car door, and which detects foreign matter being pinched by the door by a change in pressure.

When the occurrence of door pinch is detected by the door pinch detecting device of the type described above, either decreases the thrust of the door, opens the door a specified distance in a direction to fully open the door or the door is opened to a fully opened position. Using one of these options, it is then possible to relieve a passenger pinched by the door or to pull off the passenger's belongings being pinched by the door.

However, in the above-described device, when it is determined that the door is not brought to a totally closed position or that the opening/closing speed of the door at a middle position in the opening/closing operation is zero, in the decreasing state, or in the minus state, a signal for notifying that foreign matter is pinched by the tip of the door is output. Thus, as a result, the above-described device is constructed so as to detect the door pinch state by detecting that the door has been brought into the door pinch state, in other words, by detecting that the door pinch state has already occurred. As a result, the foreign matter pinched by the door continuously undergoes pressure and, in particular, when a passenger getting on or off is pinched by the door, the passenger continuously undergoes pressure until the door pinch state is detected thereby causing the passenger to feel some pain due to the applied pressure.

Moreover, to increase the sensitivity with which the door pinch state is detected, the rigidity of the door, in particular, the rigidity of rubber disposed at the tip of the door (hereinafter referred to as "door tip rubber"), needs to be increased. Although the increase in the rigidity of the rubber makes detection of the door pinch state easier, it also results in increasing the pressing pain when the door pinch state occurs, which presents a not-yet-solved problem that increasing the pressing pain experienced by the passenger is not preferable from the viewpoint of safety.

Thus, it would be desirable to provide a control device of an electrically driven door that can increase the sensitivity with which the door pinch state is detected, and which can prevent a passenger from being pressed when the door pinch state occurs and the passenger is pinched by the tip of the door.

Moreover, in an electrically driven door for a rail car, when a phenomenon occurs that foreign matter is pulled into a gap between the electrically driven door and a car body during a door opening/closing operation (also referred to as "opening door pinch"), it is difficult to determine whether or not the electrically driven door reaches a fully open position, because a maximum opening size of the electrically driven door cannot be accurately determined due to variations in the manufacturing accuracy of the car body. Thus, there is presented a not-yet-solved problem that the relate art cannot provide a more effective determination means than one that uses a decrease in door speed to determine the above-mentioned phenomenon.

Further, the door for a rail car is provided with a seal rubber for preventing a draft entering from the gap of the door while the rail car is running, and a damper for pressing the door in a direction vertical to a direction in which the door is operated so as to prevent the door from being rattled by the vibration caused when the rail car is running. Thus, even when the door is normally operated, a mechanical resistant force to an electric motor for driving the door varies from moment to moment according to the position of the door in the operation of opening/closing the door. Hence, when a door thrust is limited, it is difficult to manage a final door thrust only by limiting the thrust or torque of the electric motor, which is a not-yet-solved problem. In other words, there is presented such a not-yet-solved problem that since an increase or decrease in the mechanical resistant force varies a net door thrust, it is likely that when the margin of the door thrust becomes insufficient, normal operation will be prevented or that, when the door thrust becomes excessive at the time of door pinch, safety will be compromised.

Accordingly, it would also be desirable to provide a control device of an electrically driven door that can quickly detect the door pinch state and that can manage the net thrust of the door also to a mechanical resistant force when the door is operated.

SUMMARY OF THE INVENTION

The present invention provides a control device of an electrically driven door that can enhance the sensitivity of detection of the door pinch state and that can prevent a passenger from being pressed when the door pinch state occurs and the passenger is pinched by the tip of the door.

The invention further provides a control device of an electrically driven door that can quickly detect the door pinch state and that can manage the net thrust of the door also to a mechanical resistant force when the door is operated.

Accordingly to a preferred embodiment of the invention, a control device of an electrically driven door includes a driving force instruction value producing unit that outputs a driving force instruction value of the electrically driven door, a state observing unit that estimates a mechanical resistant force to a door driving system of the electrically driven door, a reference model that determines a dynamic characteristic of the electrically driven door to the mechanical resistant force estimated by the state observing unit, a gain compensator that computes a thrust compensation value that makes an output of the reference model coincide with an actual speed of the electrically driven door; and an adder that adds the thrust compensation value computed by the gain compensator to the driving force instruction value output by the driving force instruction value producing unit.

According to a further preferred embodiment of the invention, a control device of an electrically driven door further includes an adder that adds the mechanical resistant force of the door driving system as a compensation value of a door driving force to the driving force instruction value, the mechanical resistant force being estimated when the electrically driven door is normally operated.

According to a further embodiment of the invention, a control device of an electrically driven door is provided, wherein the mechanical resistant force of the door driving system estimated for each position of the electrically driven door when the electrically driven door is normally operated is used as the compensation value of the door driving force.

Still further, a control device of an electrically driven door opened or closed by an electric motor is preferably provided that includes a driving force instruction value producing unit that outputs a driving force instruction value of the electrically driven door, a door driving mechanism that drives the electrically driven door on the basis of the driving force instruction value output from the driving force instruction value producing unit, a state observing unit that estimates a mechanical resistant force to the door driving mechanism, and a door pinch detecting unit that detects a door pinch state when the mechanical resistant force detected by the state observing unit exceeds a specified value.

Still further, a control device of an electrically driven door is preferably provided, wherein the door pinch detecting unit detects the state of door pinch when a state where the mechanical resistant force of the door driving mechanism estimated by the state observing unit continues for a specified time or more.

Still further, a control device of an electrically driven door is preferably provided, wherein the door pinch detecting unit detects the door pinch state when a value obtained by subtracting a previously set offset value from the mechanical resistant force of the door driving mechanism estimated by the state observing unit exceeds a specified value or a state where the value exceeds the specified value continues for a specified time or more.

Still further, a control device of an electrically driven door is preferably provided, wherein an offset value for each position of the electrically driven door is set as an offset value to be subtracted from the mechanical resistant force of the door driving mechanism estimated by the state observing unit.

Still further, a control device of an electrically driven door is preferably provided, wherein an average value of the mechanical resistant forces of the door driving mechanism that have been estimated by the state observing unit when the electrically driven door has been opened or closed until then is used as an offset value subtracted from the mechanical resistant force of the door driving mechanism estimated by the state observing unit.

Still further, a control device of an electrically driven door is preferably provided, wherein the average value of the mechanical resistant forces of the door driving mechanism that have been estimated by the state observing unit is set for each position of the electrically driven door.

Still further, the invention is preferably directed to a control device of an electrically driven door, wherein the electrically driven door has a construction of a side sliding door of a rail car.

According to the invention, the state observing unit estimates the mechanical resistant force to the door driving system of the electrically driven door, produces a reference model for determining the dynamic characteristic of the electrically driven door to the estimated mechanical resistant force, computes a thrust compensation value for making the output of the reference model coincide with the actual speed of the electrically driven door, and adds this thrust compensation value to the driving force instruction value outputted by the driving force instruction value producing unit. Thus, the net thrust of the electrically driven door can be managed in such a way as to make the behavior of the electrically driven door to the external force when the state of door pinch occurs show a specified dynamic characteristic, which can reduce an impact when the state of door pinch occurs. Hence, the invention can produce the effect of providing the door that is preferably safe in the operation of the door and that is friendly to passengers getting on or off.

Moreover, according to the invention, the state observing unit estimates a mechanical resistant force to the door driving mechanism for driving the electrically driven door, and when the estimated mechanical resistant force exceeds a specified value, the door pinch detecting unit detects the state of door pinch. Hence, the invention can produce the effect of quickly detecting the state of door pinch.

Further, such the mechanical resistant force of the door driving system that is estimated when the electrically driven door is normally operated is added as the compensation quantity of the door driving force to the driving force instruction value, so that the net mechanical resistant force that is applied to the electrically driven door and which is caused by the external turbulence such as the occurrence of door pinch can be estimated.

Other features, advantages, embodiments, etc. of the invention will become apparent to those skilled in the art from the following detailed description of the preferred embodiments of the invention.

BRIEF DESCRIPTION OF THE DRAWINGS

The invention will be described with reference to certain preferred embodiments thereof and the accompanying drawings, wherein.

DETAILED DESCRIPTION OF THE PREFERRED EMBODIMENTS

Figure 1:
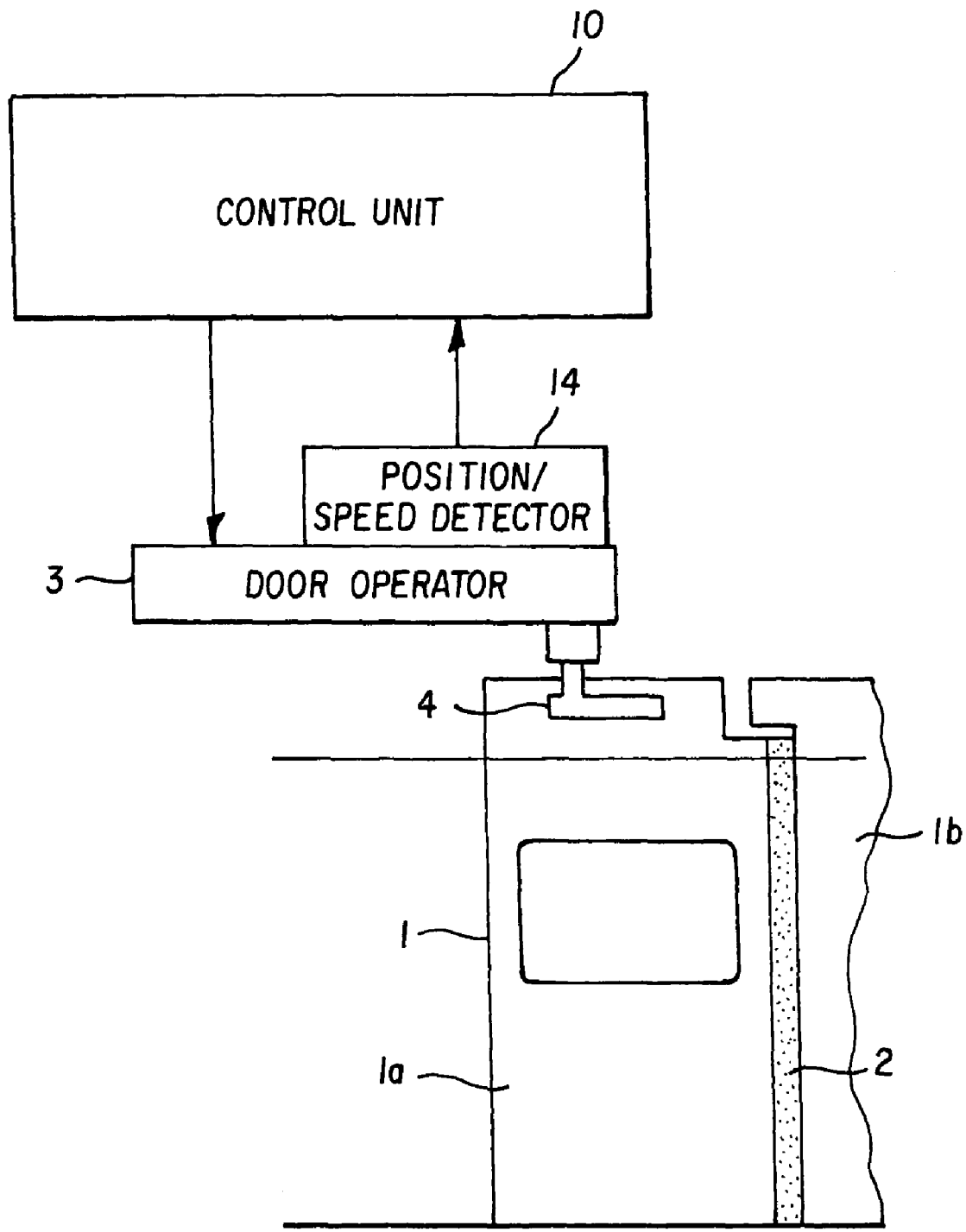
FIG. 1 is a general construction diagram in a case in which the present invention is applied to an electrically driven door of a rail car.
Figure 2:
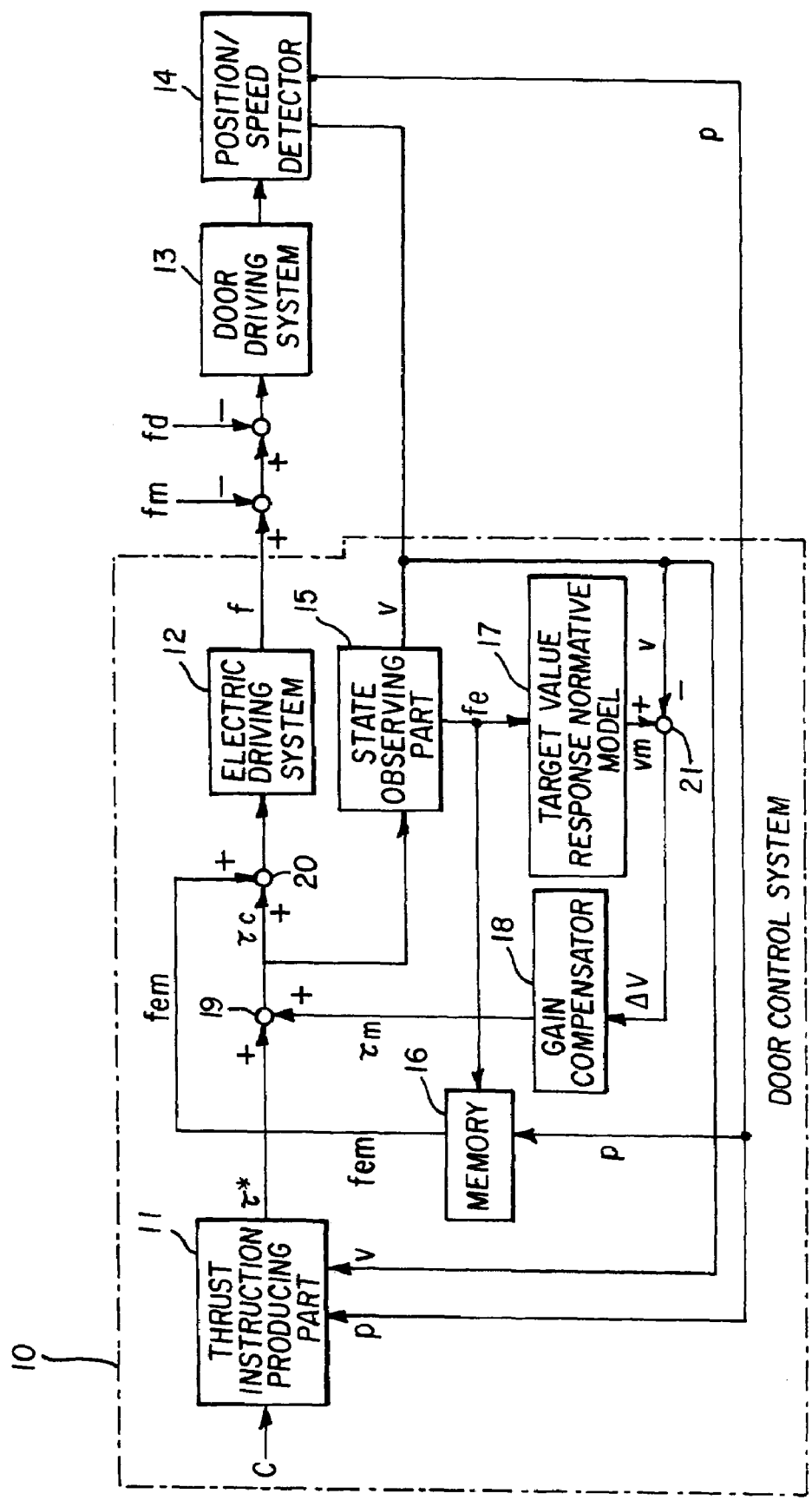
FIG. 2 is a block diagram to show the specific construction of a control device in FIG. 1 in accordance with a first embodiment of the invention.

FIG. 1 is a block diagram to show the general construction of a control device of an electrically driven door according to a first embodiment of the invention, and FIG. 2 is a block diagram to show the specific construction of the control device in FIG. 1. In FIG. 1, the car body of a rail car is provided with an electrically driven door 1 including a door closing unit that passengers use at the time of getting on or off the rail car and which is of a side sliding door type, and the respective door units 1a and 1b of this electrically driven door 1 have a door tip rubber 2 fixed to their tips on the sides to which the door units are closed. Moreover, the rail car is provided with: a door operator 3 including an electric motor for driving the electrically driven door 1 and a door driving mechanism 13 for converting or transmitting the driving force of the electric motor to the linear motion of opening or closing the door; a coupling unit 4 for coupling the door operator 3 to a door leaf; and a position/speed detector 14 that detects the position and speed of the electrically driven door 1 and which outputs position information p and door opening/closing speed information v corresponding to the position and speed. The door driving mechanism 13 is driven by an electric driving system 12 including an electric power converter such as an inverter built in a control unit 10 and of the electric motor, thereby opening/closing or driving the electrically driven door 1.

The control unit 10, as shown in FIG. 2, has a thrust instruction producing unit 11 as a driving force instruction value producing unit that has an opening/closing instruction c, the door position information p, and the door opening/closing speed information v, inputted thereto, the opening/closing instruction c being inputted from a door closing control unit (not shown) and instructing the door to open or close, the door position information p and the door opening/closing speed information v being outputted from the position/speed detector 14. When the opening/closing instruction c for opening or closing the door is input to the thrust instruction producing unit 11, the thrust instruction producing unit 11 performs a specified computation on the basis of the door position information p and the door opening/closing speed information v or refers to a control map to thereby compute a target thrust instruction τ* and outputs the computed target thrust instruction τ* to the electric driving system 12 constructed of the inverter and the electric motor. The electric driving system 12 produces a thrust f for opening or closing the door on the basis of the target thrust instruction τ*, thereby driving the door operator 3 via the door driving mechanism 13.

A thrust compensation value τm supplied from a gain compensator 18 to be described later is added to the target thrust instruction τ* outputted from the thrust instruction producing unit 11 by an adder 19, and the average value fem, which is supplied from a memory 16 to be described later and which is an average value of external force estimation values fe to estimate the sum of external forces applied to the door driving mechanism 13, is added to the target thrust instruction τ* by an adder 20, and the addition output of the adder 20 is inputted to the electric driving system 12.

Figure 7:
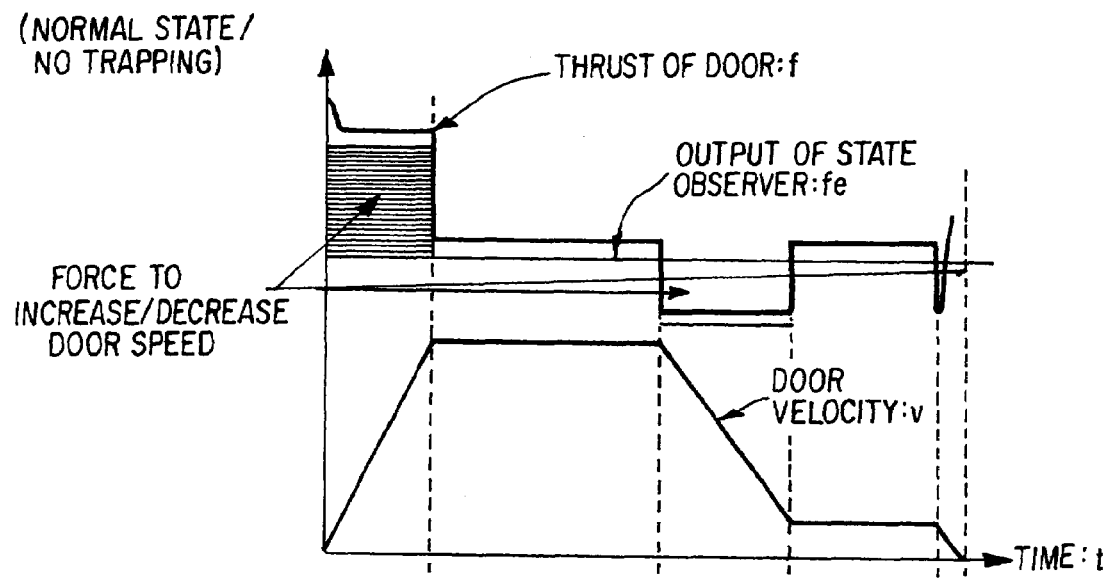
FIG. 7 is a graph illustrating the relationship between thrust and door velocity with respect to time.

A compensated thrust instruction value τc obtained by adding the thrust compensation value τm to the target thrust instruction τ* outputted from the adder 19 is supplied to one input side of a state observing unit 15, and the door opening/closing speed information v detected by the position speed detector 14 is inputted to the other input side of this state observing unit 15. The state observing unit 15 computes the external force estimation value fe on the basis of the compensated target thrust instruction τc outputted from the adder 19 and the door opening/closing speed information v, the external force estimation value fe being the sum of: a mechanical resistant force fm caused by the friction or the like of the electrically driven door 1 to the door driving mechanism 13; and an external force fd applied to the electrically driven door 1 in a state where an obstacle is pinched by the doors in the door pinch state. FIG. 7 is a graph illustrating the relationship between thrust and door velocity with respect to time.

Figure 8:
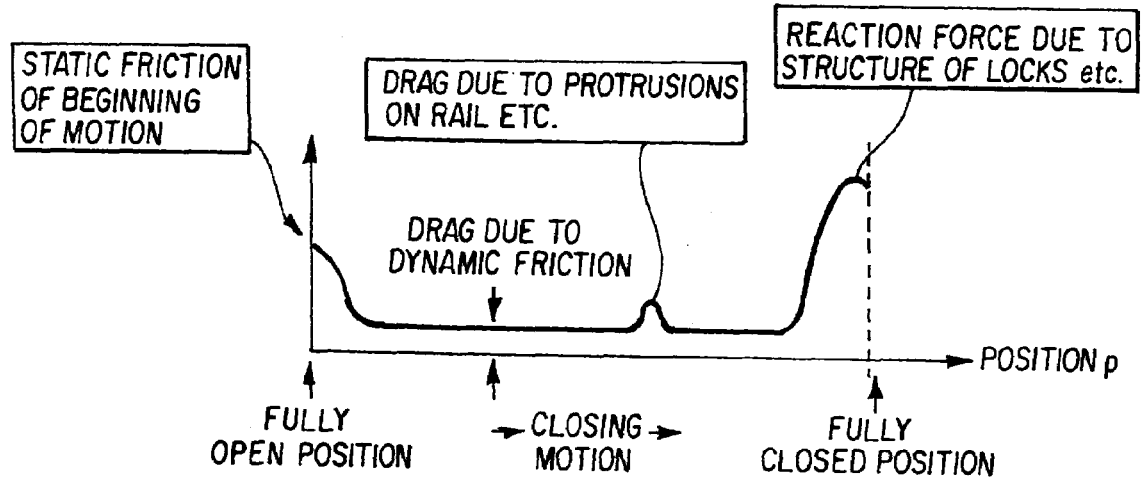
FIG. 8 illustrates frictional forces as a door moves from a fully open position to a fully closed position.

The external force estimation value fe computed by this state observing unit 15 is supplied to the memory 16 and to a target value response reference model unit 17. In the memory 16, the position information p detected by the position/speed detector 14 is inputted to the memory 16, and this position information p and history information such as the number of recordings and the external force estimation values fe are subjected in combination to a data processing by the use of various mathematical techniques, such as an arithmetic averaging technique, and then the average value fem of the external force estimation values fe of the state observing unit 15 for the respective positions of the electrically driven door 1 is stored. At this time, the electrically driven door 1 is opened or closed in a state where the electrically driven door 1 is normally lubricated and where an obstacle is not pinched by the doors, that is, the external force fd is zero, and the average value fe is stored in the memory 16. With this, the mechanical resistant force fm caused by the friction or the like of a sliding unit in the state where the electrically driven door 1 is normally lubricated can be recognized. FIG. 8 illustrates the frictional forces as the door moves from a fully open position to a fully closed position. The memory 16 reads the average value fem at a position corresponding to the position information p inputted from the position/speed detector 14 and outputs the read average value fem to the adder 20.

Moreover, the target value response reference model unit 17 to which the external force estimation value fe outputted from the state observing unit 15 is inputted expresses a mathematical reference model to express the dynamic characteristic of a soft spring for absorbing an impact when the door pinch state occurs and of the electrically driven door 1 whose apparent inertia is reduced so as to reduce the impact when the door pinch state occurs as the desirable dynamic characteristic of the electrically driven door 1 to the external force.

Figure 9:
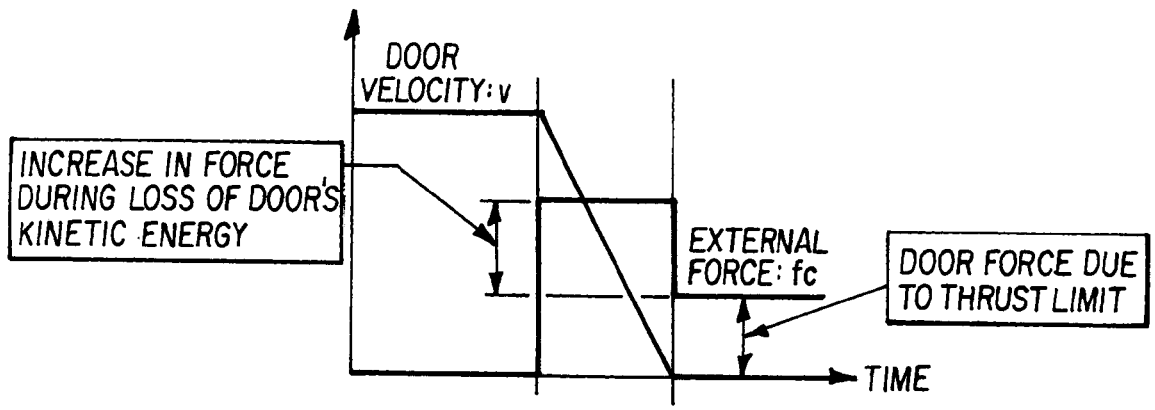
FIG. 9, for example, illustrates normal door control.
Figure 10:
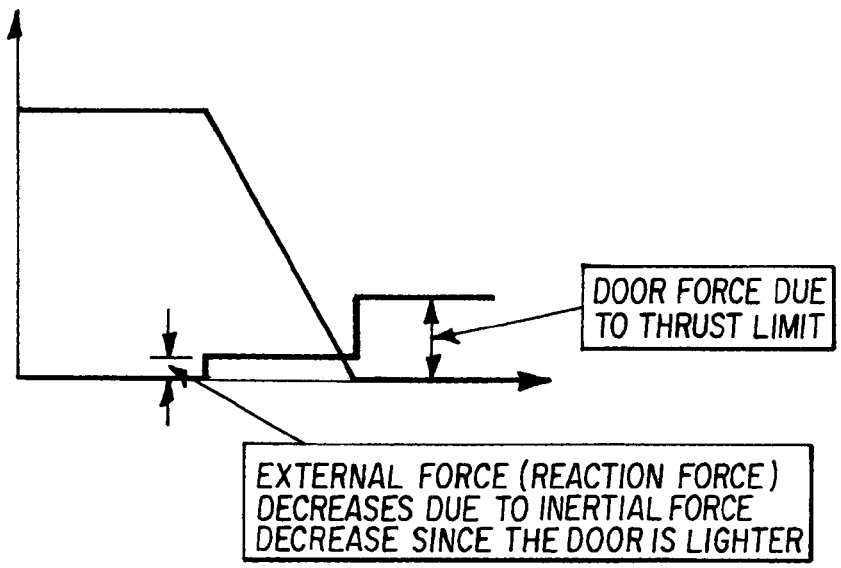
FIGS. 10 and 11 respectively illustrate examples of a lighter door and a door with a padded edge, although illustrated separately, the two models illustrated in FIGS. 10 and 11 can be combined in the reference model.
Figure 11:
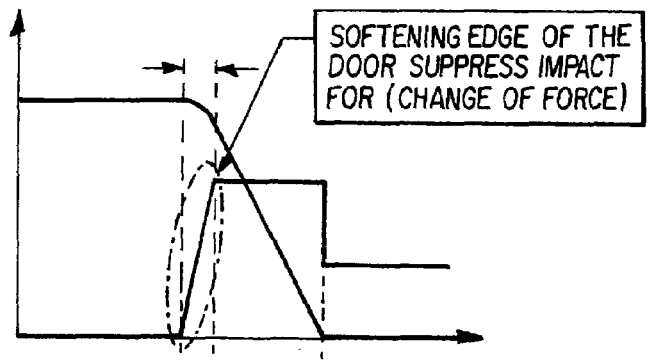

The mathematical reference model is a motion equation that expresses a desired door behavior. For example, if a door is particularly light, the impact of being trapped by such a door is small and doesn't caused much pain. Alternatively, if the edge of the door is padded with a sponge like material, the pressure and pain of impact can be alleviated to some degree. Such characteristics are expanded in the reference model into a motion equation. By including an external force fe estimated by a state observer into the model, a resulting vm simulated behavior when someone has been trapped in the door can be generated. By controlling the movement of the actual door so that is follows vm, it is possible for the door to behave as if it were the specified door (i.e. lightweight, padded, etc.) in the reference model. FIG. 9, for example, illustrates normal door control, while FIGS. 10 and 11 respectively illustrate examples of a lighter door and a door with a padded edge. Although illustrated separately, the two models illustrated in FIGS. 10 and 11 can be combined in the reference model.

A actual door opening/closing speed v is subtracted by a subtracter 21 from a speed vm acquired when the external force estimation value fe estimated by the state observing unit 15 is inputted to this reference model 17 to thereby compute a speed difference ΔV, and the computed speed difference ΔV is supplied to the gain compensator 18.

The gain compensator 18 multiplies the inputted speed difference ΔV by a specified compensation gain Kv to compute the thrust compensation value τm and supplies the computed thrust compensation value τm to the adder 19. At this time, when a proper characteristic is set as the compensation gain Kv, the speed vm outputted from the target value response reference model 17 can be made to coincide with the door opening/closing speed v actually detected by the position/speed detector 14. Here, the compensation gain Kv is not limited to a proportional gain of a sheer scalar quantity but may be a combination of proportional compensation and integral compensation and further differential compensation.

The operation of the above-mentioned first embodiment will now be described. First, when a rail car is shipped from a factory or maintained or checked, the electrically driven door 1 is repeatedly opened or closed a specified number of times in a normal operating state where the electrically driven door 1 is normally lubricated and where an obstacle is not pinched by the door, and every time the position information p, which is detected by the position/speed detector 14 when the electrically driven door 1 is repeatedly opened or closed, is varied, the external force estimation value fe of the state observing unit 15 is stored in sequence in the memory 16 in combination with the number of histories and the position information p, and a specified number of external force estimation values fe for each piece of the stored position information p are subjected to a mathematical averaging processing or a moving averaging processing, whereby an average value fem for each piece of the position information p is computed, and the computed average value fem is stored in the memory 16 along with the position information p. When the average value fem of the external force estimation value fe for each piece of the position information p detected by the state observing unit 15 in this normal operating state is stored in the memory 16, the average value fem of the external force estimation value fe in a state where the external force fd is not applied to the door driving mechanism 13, that is, the external force estimation value fe in a state where only the mechanical resistant force fm caused by the friction and the like is applied to the door driving mechanism 13 can be stored in the memory 16 for each piece of the position information p.

For this reason, when the rail car is actually stopped at a station where passengers get on or off and the door opening/closing operation instruction c is output to the thrust instruction producing unit 11 by the door closing control unit, the thrust instruction producing unit 11 computes the target thrust instruction τ* for opening or closing the electrically driven door 1 in a desired speed pattern on the basis of the position information p detected by the position/speed detector 14 and the door opening/closing speed information b and outputs the target thrust instruction τ* to the adder 19.

The adder 19 has the thrust compensation value τm computed by the gain compensator 18 inputted thereto, the thrust compensation value τm being able to make the speed vm outputted from the target value response reference model 17 coincide with the door opening/closing speed v actually detected by the position/speed detector 14 as described above, and this thrust compensation value τm is added to the target thrust instruction τ*. Thus, it is possible to control the door in such a way that the difference between the target value of the door speed and the actual door opening/closing speed v becomes zero, in other words, the electrically driven door 1 shows the dynamic characteristic specified by the target value response reference model 17.

Figure 12:
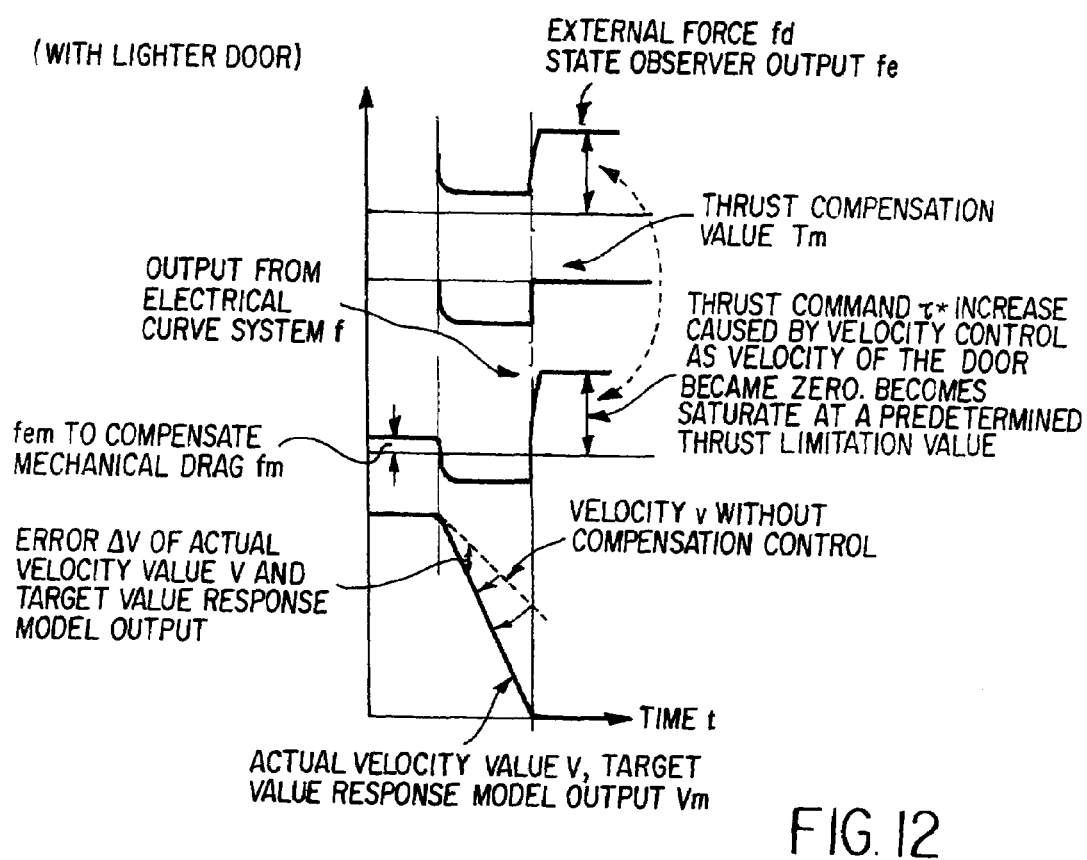
FIG. 12 illustrates an example of velocity control with compensation for a lighter door.

For this reason, when the external force fd increases, that is, the door pinch state occurs, this external force fd can be correctly estimated as the external force estimation value fe by the state observing unit 15, and when the external force estimation value fe responsive to this external force fd is estimated, the speed vm computed by the use of the target value response reference model 17 can be made to coincide with the actual door opening/closing speed v. For this reason, when the dynamic characteristic of the electrically driven door 1 to the external force applied to the electrically driven door 1, that is, to the external force applied to the electrically driven door 1 when the door pinch state occurs, is made, for example, a characteristic having elasticity like a sponge, the actual door opening/closing speed v can be controlled so as to become a speed responsive to the characteristic and hence an impact caused when the state of door pinch occurs can be reduced. FIG. 12 illustrates an example of velocity control with compensation for a lighter door.

Thus, when the above-mentioned characteristic of the electrically driven door 1 is combined with the increasing of the elasticity of the door tip rubber 2, it is possible to improve a detection sensitivity with which the door pinch state is detected and to prevent an increase in the impact caused when the door pinch state occurs. For this reason, this is desirable for the safe operation of the door and there is provided a door friendly to the passenger.

In addition, the average value fem of the external force estimation value fe responsive to the mechanical resistant force fm applied to the door driving mechanism 13 for each piece of position information p at the time of normal operation is outputted from the memory 16. Then, the average value fem is added to the compensated target thrust instruction τc by the adder 20 and the added value is supplied to the electric driving system 12, so that the thrust f into which the mechanical resistant force fm caused by the friction and the like is incorporated can be produced by the electric driving system 12, and the thrust f is supplied to the electric motor constructing the electric driving system 12. With this, the mechanical resistant force fm applied to the door driving mechanism 13 can be canceled, which makes it possible to manage a net thrust that the electrically driven door 1 produces to the outside.

Figure 3:
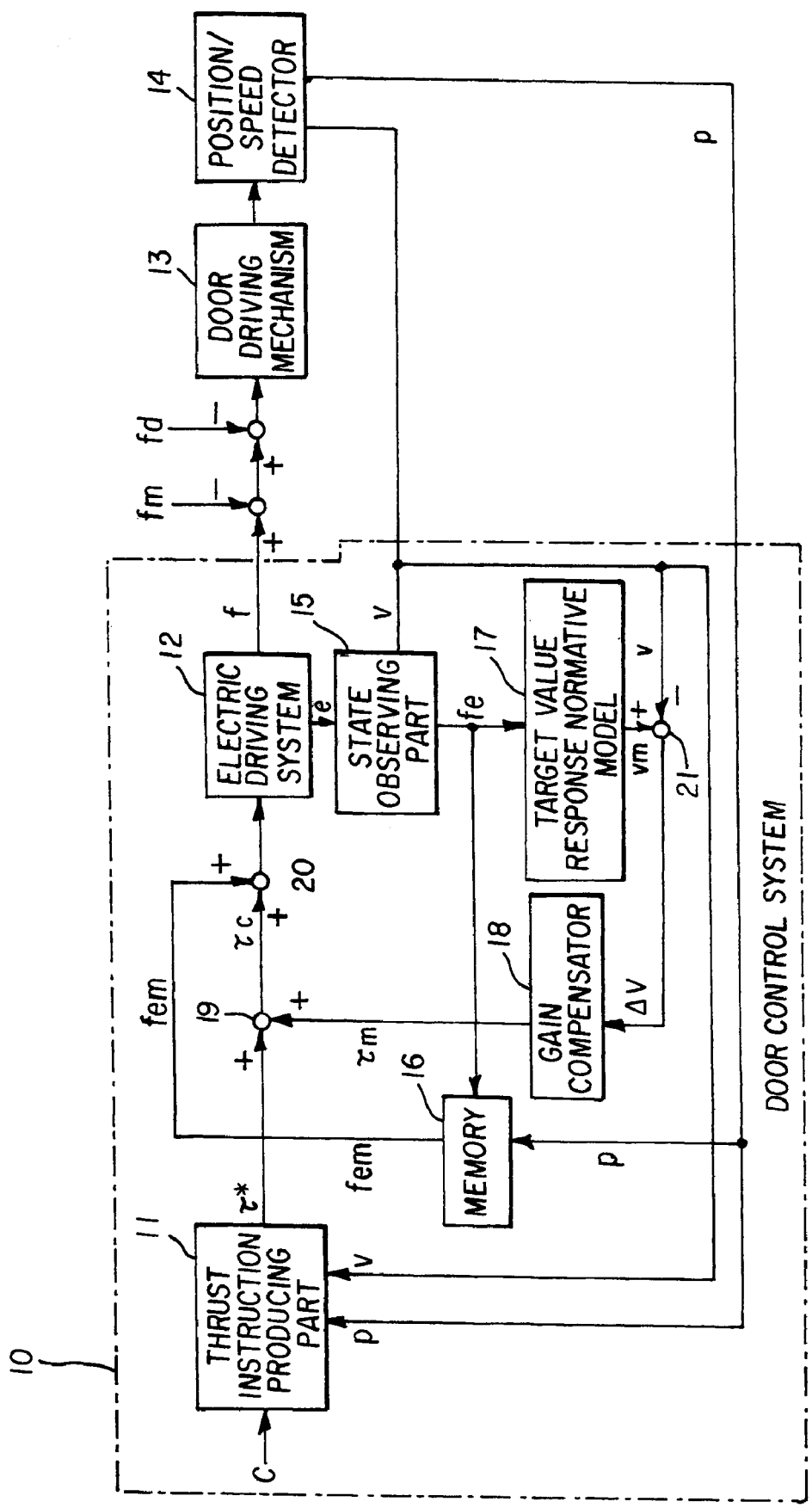
FIG. 3 is a block diagram to show the specific construction of a control device in accordance with a second embodiment of the invention.

A second embodiment of the invention will be described with reference to FIG. 3. The second embodiment has the same construction as the first embodiment except that the state quantity E of the electric driving system 12 such as voltage or current is used in place of the thrust instruction τc inputted to the electric driving system 12 as the input of the state observing unit 15. The units corresponding to the units in FIG. 2 are denoted by the same reference symbols and the detailed description of the units will be omitted.

In the second embodiment, the external force estimation value fe computed by the state observing unit 15 by the use of the state quantity E such as voltage or current to be supplied to the electric motor of the electric driving system 12 becomes the same value as in the first embodiment described above, and the same operation and effect as in the first embodiment can be produced. In this regard, the construction of the state observing unit 15 is not limited to the constructions of the first and second embodiments described above, but if an arbitrary state observing unit has a construction capable of estimating the external force (fm+fd) applied to the door driving mechanism 13, the state observing unit can be employed.

A third embodiment of the invention will be described with reference to FIG. 4. Here, the units having the same constructions as the units in the first embodiment described above are denoted by the same reference symbols and the detailed description of the units will be omitted.

Figure 4:
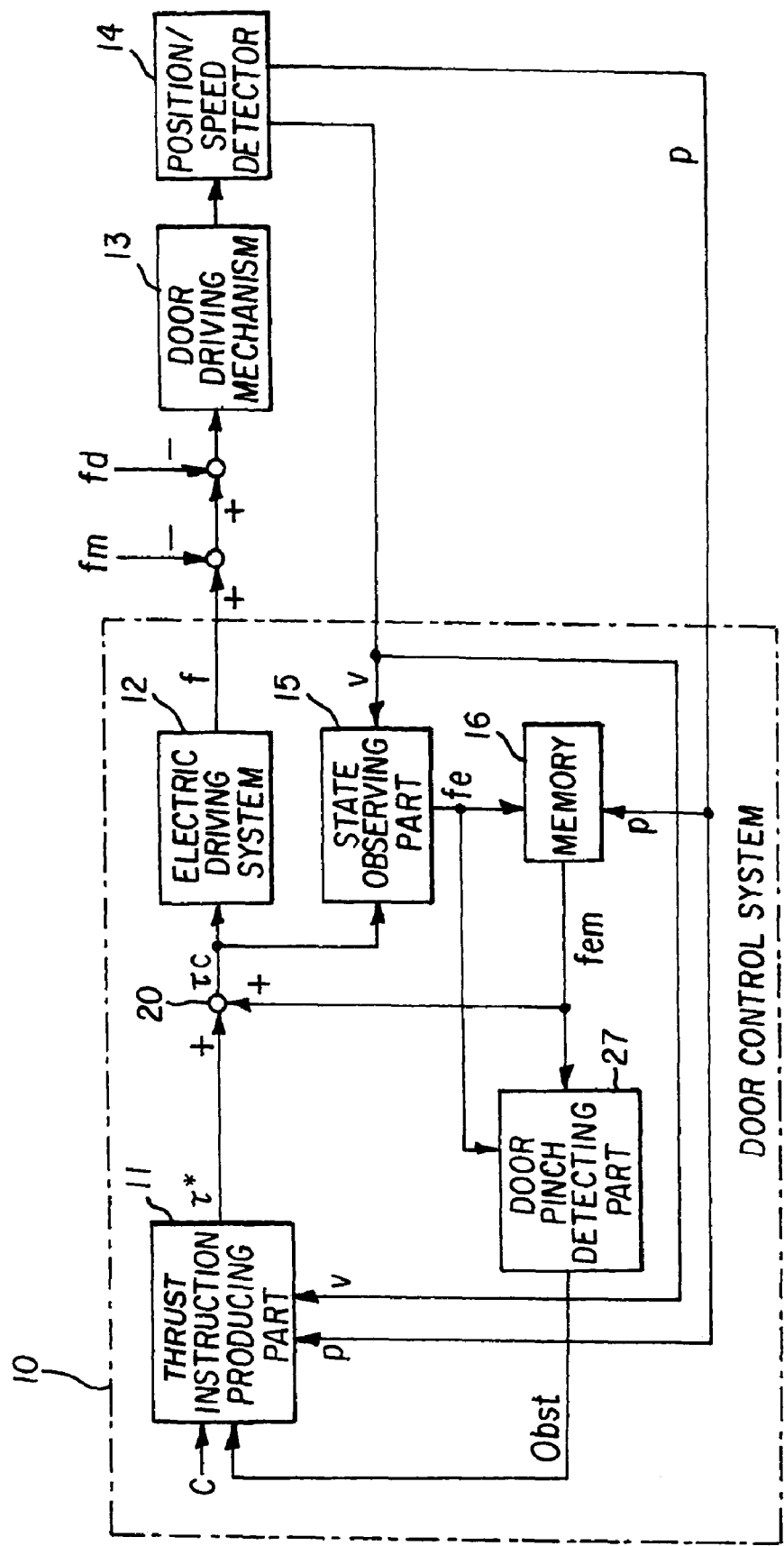
FIG. 4 is a block diagram to show the specific construction of a control device in accordance with a third embodiment of the invention.

The control unit 10, as shown in FIG. 4, has a thrust instruction producing unit 11 as a driving force instruction value producing unit that has the opening/closing operation instruction c and the door position information p and the door opening/closing speed information v inputted thereto, the opening/closing operation instruction c being inputted from a door closing control unit (not shown) and instructing the door to open or close, the door position information p and the door opening/closing speed information v being outputted from the position/speed detector 14. When the opening/closing operation instruction c for opening the door or closing the door is inputted to this thrust instruction producing unit 11, the thrust instruction producing unit 11 performs a specified computation on the basis pf the door position information p and the door opening/closing speed information v or refers to a control map to thereby compute the target thrust instruction $\tau^*$ and outputs the computed target thrust instruction $\tau^*$. Moreover, when the thrust instruction producing unit 11 has a door pinch detection signal Obst of a logic value "1" inputted thereto from a door pinch detecting unit 27 to be described later, the thrust instruction producing unit 11 sets the target thrust instruction $\tau^*$ at a comparatively small specified value.

The target thrust instruction $\tau^*$ outputted from the thrust instruction producing unit 11 is supplied to the adder 20, and the mechanical resistant force estimation value fem as a compensation quantity supplied from the memory 16, which will be described later, is added to the target thrust instruction $\tau^*$ by the adder 20, and the compensated target thrust instruction value $\tau c$ of the added output is outputted to the electric driving system 12 constructed of the inverter and the electric motor, and the thrust f for opening/closing the door is produced by the electric driving system 12 on the basis of the target thrust instruction $\tau^*$ to drive the door operator 3 via the door driving mechanism 13.

Moreover, the compensated target thrust instruction value $\tau c$ outputted from the adder 20 is supplied to one input side of the state observing unit 15. The door opening/closing speed information v detected by the position/speed detector 14 is supplied to the other input side of this state observing unit 15. The state observing unit 15 computes the mechanical resistant force estimation value fe on the basis of the compensated target thrust instruction value $\tau c$ outputted from the adder 20 and the door opening/closing speed information v, the mechanical resistant force estimation value fe being the total sum of the mechanical resistant force fm such as the friction of the electrically driven door 1 to the door driving mechanism 13 and the mechanical resistant force fd caused by external turbulence applied to the electrically driven door 1 when the door pinch state occurs.

The mechanical resistant force estimation value fe computed by this state observing unit 15 is supplied to the memory 16 and to the door pinch detecting unit 27. In the memory 16, the position information p detected by the position/speed detector 14 is input, and this position information p and the history information such as the number of recordings and the mechanical resistant force estimation value fe are subjected to a data processing in combination by the use of various mathematical techniques such as an arithmetic averaging technique, and then the average value fem of the mechanical resistant force estimation values fe of the state observing unit 15 for the respective positions of the electrically driven door 1 is stored. At this time, when the door is opened or closed in a state where the electrically driven door 1 is normally lubricated and where an obstacle is not pinched by the door, that is, the mechanical resistant force fd caused by the external turbulence is zero and the average value fem is stored in the memory 16, only the mechanical resistant force fm from which the mechanical resistant force fd caused by the external turbulence such as the door pinch state is removed, that is, which is caused by the friction of the sliding unit in the normal state of the electrically driven door 1 can be recognized. Then, the memory 16 reads the mechanical resistant force average value fem at a position corresponding to the position information p inputted from the position/speed detector 14 and outputs the read mechanical resistant force average value fem to the adder 20.

Moreover, the mechanical resistant force estimation value fe outputted from the state observing unit 15 and the mechanical resistant force average value fem outputted from the memory 16 are inputted to the door pinch detecting unit 27. The door pinch detecting 27 determines whether or not a value obtained by subtracting the mechanical resistant force average value fem as an offset value inputted from the memory 16 from the mechanical resistant force estimation value fe inputted from the state observing unit 15 exceeds a previously set threshold value fth. When fe−fem≦fth, the door pinch detecting unit 27 determines that the door pinch state does not occur and outputs a door pinch detection signal Obst of a logic value "0" to the thrust instruction producing unit 11, whereas when fe−fem>fth, the door pinch detecting unit 27 determines that the door pinch state occurs and outputs a door pinch detection signal Obst of a logic value "1" to the thrust instruction producing unit 11.

Next, the operation of the above-mentioned third embodiment will be described. First, when a rail car is shipped from a factory or maintained or checked, the electrically driven door 1 is repeatedly opened or closed a specified number of times in a normal operating state where the electrically driven door 1 is normally lubricated and where an obstacle is not pinched by the door, and every time the position information p, which is detected by the position/speed detector 14 when the electrically driven door 1 is repeatedly opened or closed, is varied, the external force estimation value fe of the state observing unit 15 is stored in sequence in the memory 16 in combination with the number of histories and the position information p. A specified number of external force estimation values fe for each piece of the stored position information p are subjected to a mathematical averaging processing or a moving averaging processing, whereby an average value fem for each piece of the position information p is computed, and the computed average value fem is stored in the memory 16 along with the position information p.

When the average value fem of the external force estimation values fe for each piece of the position information p detected by the state observing unit 15 in the normal operating state is stored in the memory 16 in this manner, the average value fem of the mechanical thrust estimation value fe in a state where the mechanical resistant force fd caused by the external turbulence developed when the door pinch state occurs is not applied to the door driving mechanism 13, that is, the mechanical thrust estimation value fe in a state where only the mechanical resistant force fm caused by the friction and the like is applied to the door driving mechanism 13 can be stored in the memory 16 for each piece of the position information p.

For this reason, when the rail car is actually stopped at a station where passengers get on or off and the door opening/ closing operation instruction c is outputted to the thrust instruction producing unit 11 by the door closing control unit, this thrust instruction producing unit 11 computes the target thrust instruction $\tau^*$ for opening or closing the electrically driven door 1 in a desired speed pattern on the basis of the position information p detected by the position/speed detector 14 and the door opening/closing speed information b and outputs the computed target thrust instruction $\tau^*$ to the adder 20.

The mechanical thrust average value fern for each piece of the position information p of the electrically driven door 1, which is previously stored in the memory 16 as described above, is inputted to the adder 20, so that the compensated target thrust instruction $\tau c$ obtained by adding the mechanical thrust average value fern to the target thrust instruction $\tau^*$ is supplied to the electric driving system 12. Hence, the thrust f into which the mechanical resistant force fm such as friction and the like is incorporated can be produced by the electric driving system 12, and the thrust f is supplied to the electric motor constructing the electric driving system 12. With this, the mechanical resistant force fm applied to the door driving mechanism 13 can be canceled, which makes it possible to manage a net thrust that the electrically driven door 1 produces to the outside.

At this time, in a state where the door pinch state does not occur, the mechanical resistant force fd caused by the external turbulence applied to the door driving mechanism 13 is nearly equal to zero, and only the mechanical resistant force fm caused by the friction and the like is applied to the door driving mechanism 13. For this reason, the state observing unit 15 has the door opening/closing speed information v of the door driving mechanism 13 and the compensated target thrust instruction $\tau c$ inputted thereto, the door opening/closing speed information v not undergoing the effect of the mechanical resistant force fd produced by the external turbulence, the compensated target thrust instruction $\tau c$ being obtained by adding the mechanical resistant force average value fem corresponding to the mechanical resistant force fm to the thrust instruction $\tau^*$, so that the mechanical resistant force estimation value fe computed by the state observing unit 15 is nearly equal to zero and is inputted to the door pinch detecting unit 27. For this reason, because the inputted mechanical resistant force estimation value fe is nearly equal to zero, fe−fem$\leqq$fth. Thus, the door pinch detecting unit 27 determines that the door pinch state does not occur and hence outputs the door pinch detection signal Obst of a logic value "0" to the thrust instruction producing unit 11.

For this reason, the thrust instruction producing unit 11 computes the target thrust instruction $\tau^*$ of the speed pattern based on the position information p and the door opening/closing speed information v, which are detected by the position/speed detector 14, and outputs the computed target thrust instruction $\tau^*$ to the adder 20. Thus, the electric driving system 12 produces the door thrust f to open or close the electrically driven door 1 via the door driving mechanism 13.

Figure 5:
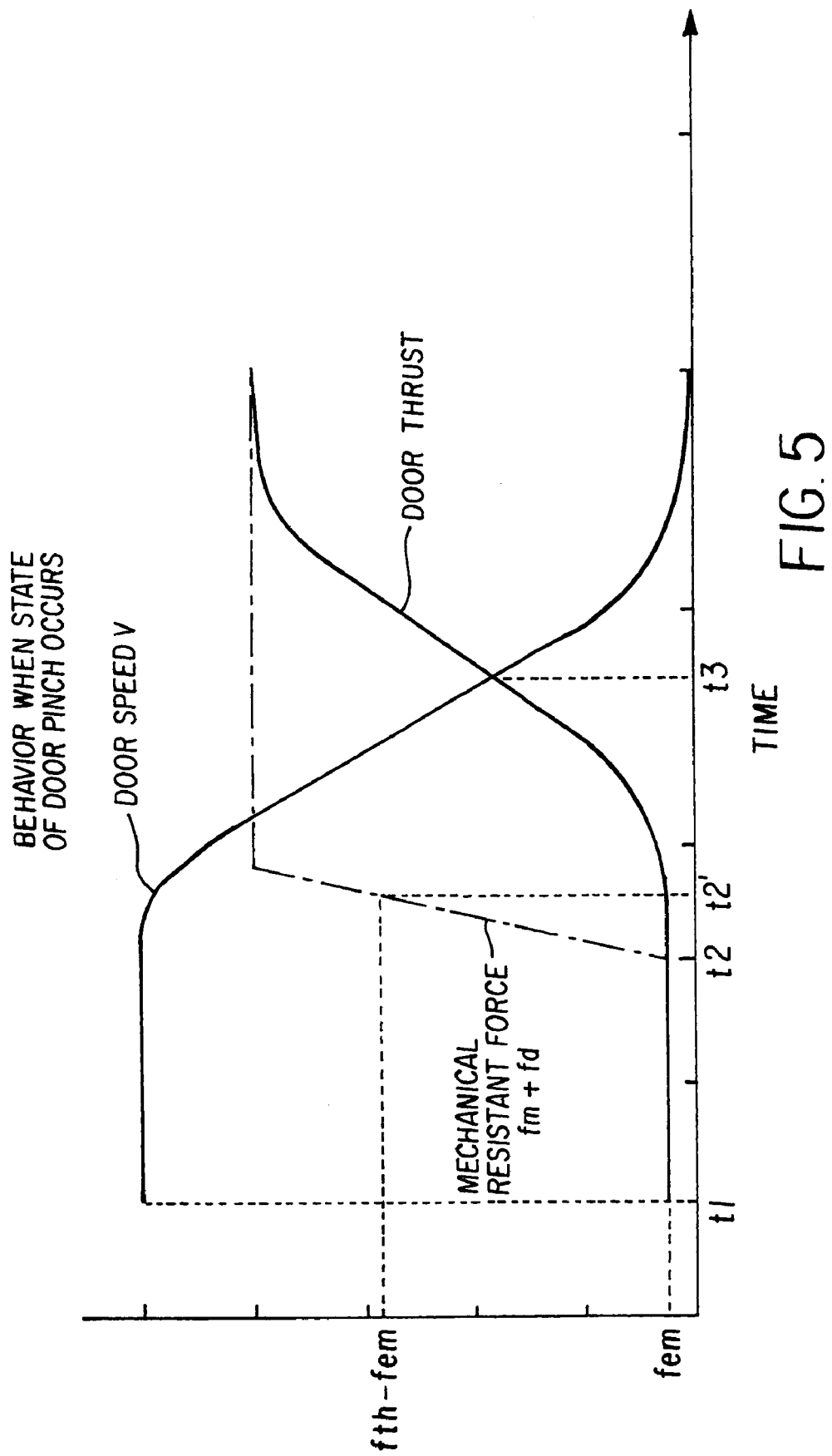
FIG. 5 is a characteristic curve graph to show the door pinch state.

In a state where the electrically driven door 1 is driven to, for example, to the closed state in this normal state, as shown by timing t1 in FIG. 5, the door thrust f outputted from the electric driving system 12 shows a low value and the mechanical resistant force (fm+fd) to the door driving mechanism 13 also becomes a small value of only the mechanical resistant force fm caused by the friction and the like. Thus, the door opening/closing speed v becomes a usual comparatively high speed.

From this normal state, when the door pinch state of door pinch in which a passenger or a passenger's belonging is pinched by the electrically driven door 1 occurs at timing t2, the mechanical resistant force fd caused by the occurrence of the door pinch state increases rapidly and hence the mechanical resistant force (fm+fd) to the door driving mechanism 13 increases sharply as shown in FIG. 5.

At this time, in the case of a construction in the related art that does not employ the door pinch detecting unit 27, the door driving mechanism 13 itself has a specified quantity of momentum and hence the door opening/closing speed v does not decrease immediately but gradually decreases. Moreover, as the door opening/closing speed v decreases, the electric driving system 12 of the electrically driven door 1 compensates the thrust, so that the door opening/closing speed v decreases further slowly. That is, in a mode in the related art in which the door pinch state is detected on the basis of a decrease in the door opening/closing speed or an increase in the driving current of a linear motor 3, the state of door pinch is detected, for example, after timing t3 shown in FIG. 3 and hence the detection of the door pinch state is delayed. Thus, when a unit of the body of a passenger getting on or off is pinched by the electrically driven door 1, the part of the body is continuously pressed and raises a high possibility that a pain as a result of the pressing will develop.

In contrast to this, in this embodiment, the door pinch detecting unit 27 has the mechanical resistant force estimation value fe and the mechanical resistant force average value fem as an offset value inputted thereto, the mechanical resistant force estimation value fe being estimated by the state observing unit 15, the mechanical resistant force average value fem being stored in the memory 16 and corresponding to only the mechanical resistant force fm that is caused by the friction and the like in the normal state and that does not include the mechanical resistant force fd caused by the external turbulence of the state of door pinch. Thus, when the door pinch state occurs at the timing t2 to rapidly increase the mechanical resistant force (fm+fd), as shown in FIG. 3, the mechanical resistant force estimation value fe output from the state observing unit 15 also rapidly increases. For this reason, in the door pinch detecting unit 27, at timing t2' when the value (fe−fem) obtained by subtracting the mechanical resistant force average value fem from the mechanical resistant force estimation value fe becomes a state that exceeds the threshold value fth, the door pinch detection signal Obst is turned to a logic value "1" from a logic value "0". Since this door pinch detection signal Obst is supplied to the thrust instruction production unit 11, the thrust instruction $\tau^*$ having been computed until then by the thrust instruction production unit 11 is changed to a low thrust set value previously set to thereby prevent the door thrust f from increasing. With this, even when a part of the body of the passenger getting on or off is pinched by the electrically driven door 1, it is possible to make sure that pressure is not applied to the the part of the body being pinched.

In this manner, in the detection of the door pinch state in the related art, the occurrence of the door pinch state is detected by a decrease to a certain level of the door speed, for example, the stoppage of the electrically driven door 1, which is caused as a result of the occurrence of the door pinch, or by the fact that the electrically driven door 1 is not brought to a totally closed position 1 by an obstacle. In contrast to this, in this embodiment, the occurrence of the door pinch state can be detected on the basis of an increase in the mechanical resistant force caused by the occurrence of the door pinch state and hence the door pinch state can be detected more quickly than in the related art. As a result, even when the part of the body of the passenger getting on or off is pinched by the door, the safe operation of relieving door pinch, such as decreasing the door thrust, can be performed more quickly and hence the safety of the door can be further enhanced.

Further, the previously set mechanical resistant force or the mechanical resistant force previously estimated by the state observing unit 15 is added to the thrust instruction τ* and the added thrust instruction is inputted to the state observing unit 15, so that the net mechanical resistant force applied to the electrically driven door 1 by the external turbulence such as the occurrence of the state of door pinch can be estimated and hence the sensitivity and the detection accuracy with which the state of door pinch can be detected can be enhanced.

Moreover, the door pinch detecting unit 27 detects not only the door pinch state but also a state where a part of the body of the passenger or a passenger's belonging is pulled into a door guard when the electrically driven door 1 is opened, the so-called opening door pinch phenomenon because the mechanical resistant force estimation value fe estimated by the state observing unit 15 increases also in the opening door pinch phenomenon.

Still further, the thrust of the electrically driven door 1 is managed by previously canceling the mechanical resistant force fm of the electrically driven door 1 that is varied according to the door position p when the electrically driven door 1 is opened or closed. Thus, the safety of the electrically driven door 1 and the certainty of the door operation can be achieved at the same time. Thus, it is possible to detect the door pinch state with high sensitivity and quickly, and it is possible to provide an electrically driven door friendly to the passengers getting on and off.

Figure 6:
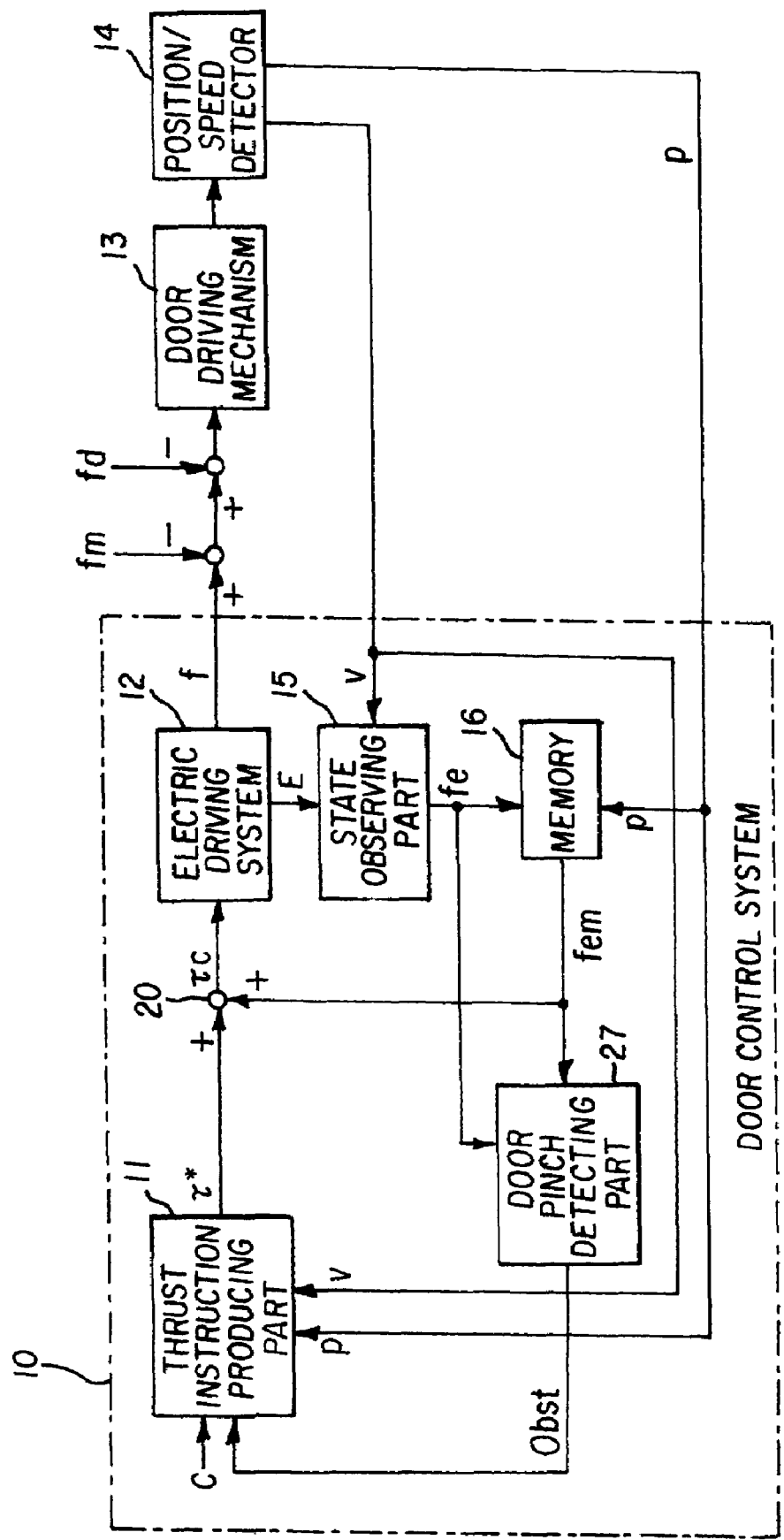
FIG. 6 is a block diagram to show the specific construction of a control device in accordance with a fourth embodiment of the invention.

A fourth embodiment of the invention will be described with reference to FIG. 6. The fourth embodiment has the same construction as the above-mentioned third embodiment except that in place of the thrust instruction τc given to the electric driving system 12, the state quantity E of the electric driving system 12 such as voltage or current is used as an input to the state observing unit 15. The units corresponding to the units in FIG. 4 are denoted by the same reference symbols, and the detailed description of the units will be omitted.

In the fourth embodiment, the external force estimation value fe computed by the state observing unit 15 by the use of the state quantity E such as voltage or current to be supplied to the linear motor of the electric driving system 12 becomes a value nearly equal to that in the first embodiment, and hence the same operation and effect as in the first embodiment can be produced. In this regard, the above-mentioned first and second embodiments have been described with respect to a case in which when the value obtained by subtracting the mechanical resistant force average value fem as the offset value stored in the memory 16 from the mechanical resistant force estimation value fe estimated by the state observing unit 15 exceeds the threshold value fth, the door pinch detecting unit 27 determines that the door pinch state occurs, but the invention is not limited to this. The door pinch detecting unit 27 may determine that when a state in which the value obtained by subtracting the mechanical resistant force average value fem from the mechanical resistant force estimation value fe exceeds the threshold value fth continues for a specified time, the state of door pinch occurs. In this case, even when the threshold value fth is set at a value smaller than the values in the third and fourth embodiments, it is possible to prevent a false determination of the door pinch state. Here, the specified time is set shorter than a detection time in the relate art.

Moreover, the third and fourth embodiments have been described with respect to a case in which the door pinch detecting unit 27 subtracts the mechanical resistant force average value fem stored in the memory 16 as the offset value from the mechanical resistant force estimation value fe outputted from the state observing unit 15, but the invention is not limited to this. An offset value previously set for each position of the electrically driven door 1 can be also used as the offset value.

Further, the construction of the state observing unit 15 is not limited to the construction of the third and fourth embodiments, but an arbitrary state observing unit can be employed, if the state observing unit has a construction capable of correctly estimating the external force (fm+fd) applied to the door driving mechanism 13.

Still further, the first to fourth embodiments have been described with respect to a case in which the invention is applied to the electrically driven door 1 of the rail car, but the invention is not limited to this. The invention can be applied also to an electrically driven door mounted in a vehicle such as an automobile. Further, the invention can be applied not only to a door of a construction of a side sliding door but also to a door of the other construction.

Still further, the first to fourth embodiments have been described with respect to a case in which the invention is applied to the electrically driven door 1 constructed of the rotary electric motor and the door driving mechanism 13 for converting the rotational force of the rotary electric motor to the linear motion of the door, but the invention is not limited to this. The invention can be applied also to a case in which the door is directly driven by a leaner motor moving linearly.

The invention has been described with reference to certain preferred embodiments thereof. It will be understood, however, that further modifications and variations are possible within the scope of the appended claims. For example, it will be understood that the various components and units of the described embodiments may be implemented using discrete hardware components, firmware or programmable devices employing software modules to perform the various illustrated functions. In other words, the invention is not limited to specific structural components utilized to implement the functions performed by the illustrated embodiments, but instead, can be implemented utilizing any combination of physical devices and components.

This application is based on and claims priority to Japanese Patent Applications JP 2008-216775, filed on Aug. 26, 2008 and JP 2008-216776, filed on Aug. 26, 2008. The disclosure of the priority applications in their entirety, including the drawings, claims, and the specification thereof, is incorporated herein by reference

What is claimed is:

1. A control device of an electrically driven door opened or closed by an electric motor, the control device comprising:
    a driving force instruction value producing unit that outputs a driving force instruction value of the electrically driven door;
    a door driving mechanism that drives the electrically driven door on a basis of the driving force instruction value output from the driving force instruction value producing unit;
    a state observing unit that estimates a mechanical resistant force to the door driving mechanism; and
    a door pinch detecting unit that detects a door pinch state when the mechanical resistant force detected by the state observing unit exceeds a specified value
    wherein the door pinch detecting unit detects the door pinch state when a value obtained by subtracting a previously set offset value from the mechanical resistant force of the door driving mechanism estimated by the state observing unit exceeds a specified value or a state where the value exceeds the specified value continues for a specified time.

2. The control device of an electrically driven door as claimed in claim 1, wherein the door pinch detecting unit detects the door pinch state when a state where the mechanical resistant force of the door driving mechanism estimated by the state observing unit continues for a specified time.

3. The control device of an electrically driven door as claimed in claim 1, wherein an offset value for each position of the electrically driven door is set as an offset value to be subtracted from the mechanical resistant force of the door driving mechanism estimated by the state observing unit.

4. The control device of an electrically driven door as claimed in claim 1, wherein an average value of the mechanical resistant forces of the door driving mechanism that have been estimated by the state observing unit when the electrically driven door has been opened or closed until then is used as an offset value to be subtracted from the mechanical resistant force of the door driving mechanism estimated by the state observing unit.

5. The control device of an electrically driven door as claimed in claim 4, wherein the average value of the mechanical resistant forces of the door driving mechanism having been estimated by the state observing unit is set for each position of the electrically driven door.

6. The control device of an electrically driven door as claimed in claim 1, wherein the electrically driven door comprises a side sliding door of a rail car.

7. A method of controlling an electrically driven door opened or closed by an electric motor, the method comprising:

generating a driving force instruction value of the electrically driven door using a driving force instruction value producing unit;

driving the electrically driven door using a door driving mechanism on a basis of the driving force instruction value output from the driving force instruction value producing unit;

estimating a mechanical resistant force to the door driving mechanism using a state observing unit; and detecting a door pinch state using a door pinch detecting unit when the mechanical resistant force detected by the state observing unit exceeds a specified value;

wherein the door pinch detecting unit detects the door pinch state when a value obtained by subtracting a previously set offset value from the mechanical resistant force of the door driving mechanism estimated by the state observing unit exceeds a specified value or a state where the value exceeds the specified value continues for a specified time.

8. The method of claim 7, wherein the door pinch detecting unit detects the door pinch state when a state where the mechanical resistant force of the door driving mechanism estimated by the state observing unit continues for a specified time.

9. The method of claim 7, wherein an offset value for each position of the electrically driven door is set as an offset value to be subtracted from the mechanical resistant force of the door driving mechanism estimated by the state observing unit.

10. The method of claim 7, wherein an average value of the mechanical resistant forces of the door driving mechanism that have been estimated by the state observing unit when the electrically driven door has been opened or closed until then is used as an offset value to be subtracted from the mechanical resistant force of the door driving mechanism estimated by the state observing unit.

11. The method of claim 10, wherein the average value of the mechanical resistant forces of the door driving mechanism having been estimated by the state observing unit is set for each position of the electrically driven door.

* * * * *